United States Patent [19]

Leone et al.

[11] Patent Number: 5,426,592
[45] Date of Patent: Jun. 20, 1995

[54] CIRCUIT BREAKER TRIP UNIT WHICH AUTOMATICALLY ADAPTS TO OPERATED WITH A PARTICULAR DISPLAY MODULE

[75] Inventors: David A. Leone, Lawrenceville; James O. Alexander, Atlanta; William A. King, Lithonia, all of Ga.

[73] Assignee: Siemens Energy & Automation, Inc., Alpharetta, Ga.

[21] Appl. No.: 292,129

[22] Filed: Aug. 17, 1994

Related U.S. Application Data

[63] Continuation of Ser. No. 198,683, Feb. 18, 1994, abandoned, which is a continuation of Ser. No. 847,709, Mar. 6, 1992, abandoned.

[51] Int. Cl.$^6$ ............................................. H01H 63/00
[52] U.S. Cl. ..................................... 364/492; 364/481; 364/483; 364/489; 364/490; 361/91; 361/93; 361/87; 361/96; 361/71; 361/42
[58] Field of Search ............... 364/492, 481, 483, 480, 364/489; 361/91, 93, 643, 87, 96, 97, 42, 50, 71; 307/38, 132 E, 39

[56] References Cited

U.S. PATENT DOCUMENTS

| | | | |
|---|---|---|---|
| 4,143,417 | 3/1979 | Wald et al. | 364/900 |
| 4,245,318 | 1/1981 | Eckart et al. | 364/481 |
| 4,351,012 | 9/1982 | Elms et al. | 361/96 |
| 4,377,836 | 3/1983 | Elms et al. | 361/96 |
| 4,377,837 | 3/1983 | Matsko et al. | 361/105 |
| 4,431,988 | 2/1984 | Molusis et al. | 340/712 |
| 4,467,434 | 8/1984 | Hurley et al. | 364/483 |
| 4,481,512 | 11/1984 | Tscheulin et al. | 340/825.25 |
| 4,507,526 | 3/1985 | Thoma | 200/38 R |
| 4,527,285 | 7/1985 | Kekas et al. | 455/607 |
| 4,535,409 | 8/1985 | Jindrick et al. | 364/481 |
| 4,589,052 | 5/1986 | Dougherty | 361/94 |
| 4,628,397 | 12/1986 | Gareis et al. | 361/98 |
| 4,631,625 | 12/1986 | Alexander et al. | 361/94 |
| 4,672,501 | 6/1987 | Bilac et al. | 361/96 |
| 4,694,373 | 9/1987 | Demeyer | 361/96 |
| 4,728,914 | 3/1988 | Morris et al. | 335/6 |
| 4,749,364 | 6/1988 | Arney et al. | 439/372 |
| 4,751,605 | 6/1988 | Mertz et al. | 361/91 |
| 4,752,853 | 6/1988 | Matsko et al. | 361/94 |
| 4,780,786 | 10/1988 | Weynachter et al. | 361/87 |
| 4,794,356 | 12/1988 | Yu et al. | 335/13 |
| 4,794,484 | 12/1988 | Matsko et al. | 361/93 |
| 4,814,712 | 3/1989 | Burton et al. | 324/424 |
| 4,827,369 | 5/1989 | Saletta et al. | 361/96 |
| 4,870,531 | 9/1989 | Danek | 361/93 |
| 4,945,443 | 7/1990 | DeBiasi et al. | 361/93 |
| 4,958,252 | 9/1990 | Murphy | 361/93 |
| 4,979,070 | 12/1990 | Bodkin | 361/42 |
| 4,991,105 | 2/1991 | Pimental | 364/483 |
| 5,136,457 | 8/1992 | Durivage, III | 361/93 |
| 5,166,887 | 11/1992 | Farrington et al. | 364/483 |
| 5,204,798 | 4/1993 | Scott | 361/93 |

FOREIGN PATENT DOCUMENTS

| | | |
|---|---|---|
| 0193732 | 1/1986 | European Pat. Off. . |
| 0193449 | 2/1986 | European Pat. Off. . |
| 0279691 | 8/1988 | European Pat. Off. . |
| 2513436 | 9/1982 | France . |
| 0493272 | 12/1991 | France . |
| 4072927 | 4/1985 | Japan . |

*Primary Examiner*—Kevin J. Teska
*Assistant Examiner*—Jacques H. Louis-Jacques
*Attorney, Agent, or Firm*—Peter A. Luccarelli, Jr.; James G. Morrow

[57] ABSTRACT

The present invention provides a circuit breaker trip unit configured to operate with a plurality of different plug-in display units. The display unit includes a memory which stores data representative of the particular display unit, and which allows the trip unit to automatically adapt to communicate with the display modules. The trip unit includes a processor and programming which permits a bi-directional flow of data between the units, such as display data and control data.

15 Claims, 8 Drawing Sheets

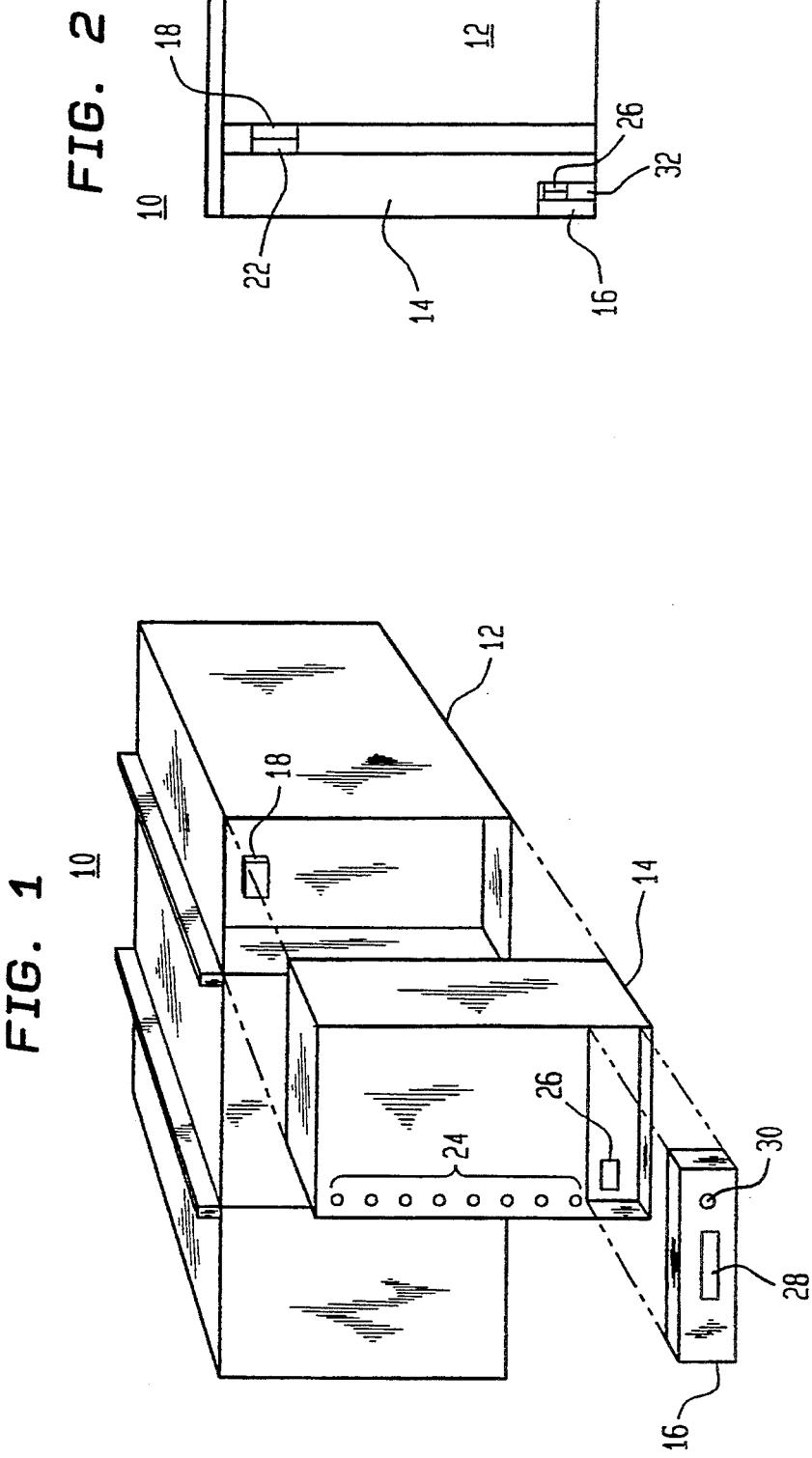

CIRCUIT BREAKER TRIP UNIT WHICH AUTOMATICALLY ADAPTS TO OPERATED WITH A PARTICULAR DISPLAY MODULE

CROSS-REFERENCE TO RELATED APPLICATION

This is a continuation of Ser. No. 08/198,683 filed Feb. 18, 1994 now abandoned, which is in turn a continuation of application Ser. No. 07/847,709, filed on Mar. 6, 1992 now abandoned.

FIELD OF THE INVENTION

The present invention relates to a circuit breaker trip unit having a display. More specifically, the present invention relates to a trip unit which is coupleable to one of a plurality of different displays, where the trip unit is configured to automatically recognize the type of display to which it is coupled and apply signals to the display unit which are compatible with the display unit.

BACKGROUND OF THE INVENTION

In general, display units for circuit breaker trip units are known. Referring to U.S. Pat. No. 4,870,531 issued to Robert J. Danek, there is shown a circuit interrupter having a display for viewing circuit interrupter settings. The display removably connects to the electronic trip unit of the interrupter, and displays interrupter values and settings when in operation. When the display unit is not in place, a security cover 20 may be positioned within a recess which is adapted to accept the display.

U.S. Pat. No. 4,751,605, issued to Mertz et al., also discloses a trip device for a circuit interrupter having a display unit. The display unit is portable and is coupleable to the trip device to display various circuit interrupter values. The display unit includes an alphanumeric display, a microprocessor, memory, and an apparatus associable with complementary apparatus in the trip device to transfer the contents of memory areas in the trip device to the memory of the display device. The content of the memory is selectively displayed by the reader.

While various display unit configurations are available for circuit interrupters (breakers), it would be useful and desirable to provide a trip unit useable with a plurality of different display units, where each display unit is configured to display a range of values for a given variable monitored by the trip unit e.g. current, temperature, energy, power, etc. Accordingly, depending upon the application for a circuit breaker, only a display unit configured to display the variables which are needed for the application is provided.

SUMMARY OF THE INVENTION

The present invention provides a circuit breaker trip unit. The trip unit includes a first connector, a processor, a data bus coupled between the connector and the processor, and a display module. The display module includes a memory which stores configuration data, and a second connector coupled to the memory and the first connector. The processor reads the configuration data and controls the data transfer between the processor and module based upon the configuration data.

The present invention further provides a system for adapting the operation of a trip unit to a particular display module. The trip unit includes a processor, and a first connector coupled to the processor. The system provides at least two display module types, where a first display module includes a first memory which stores a first configuration data coupled to a second connector. A second display module includes a second memory which stores a second configuration data coupled to a third connector. When the first and second connectors are connected, the processor reads the first memory, and applies first display data to the first display module in response to the value of the first configuration data. When the first and third connectors are connected, the processor reads the second memory and applies second display data to the second display module in response to the value of the second configuration data.

BRIEF DESCRIPTION OF THE DRAWINGS

FIG. 1 is an exploded, schematic view of a circuit breaker contact and operating mechanism unit, a trip unit and a display unit;

FIG. 2 is a side, schematic view of the circuit breaker contact and operating mechanism, trip unit and display unit when coupled;

DETAILED DESCRIPTION OF THE PREFERRED EMBODIMENT

Figure 3:
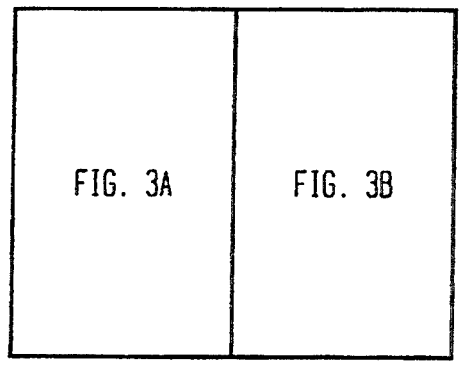
FIG. 3 is the circuit diagram for the display unit.

Referring to FIGS. 1 and 2, a circuit breaker 10 includes a circuit breaker contact and operating mechanism 12, an electronic trip unit 14, and a removable and interchangeable display unit 16. Mechanism 12 may be a conventional mechanism including the operating linkages and energy storing devices for opening the contacts of circuit breaker 10. Additionally, mechanism 12 includes monitoring devices, such as current transformers and temperature sensors, which produce status signals representative of the current flows and various temperatures in circuit breaker 10. The monitoring devices are electrically coupled to a connector 18 of mechanism 12 such that the status signals for the monitoring devices are applied to connector 18. Additionally, mechanism 12 includes tripping devices which are coupled to connector 18 and cause mechanism 12 to open the circuit breaker contacts in response to the application of control signals at connector 18.

Electronic trip unit 14 is of the type including a programmed micro-controller 20 (processor) which has circuitry coupled to a connector 22 for monitoring the status signals applied to connector 18. The circuitry includes devices for performing conditioning functions such as analog-to-digital conversion and filtering so that processor 20 may properly monitor and analyze the status signals at connector 18. Unit 14 also includes a plurality of limit set inputs such as potentiometers 24. Potentiometers 24 allow variables such as long time delay, short time pick-up, short time delay, instantaneous pickup, ground fault pickup and ground fault delay to be adjusted. Based upon the values of the status signals and the settings at potentiometers 24, processor 20 applies the appropriate control signals and display signals to connectors 18 and 26, respectively. Connector 26 is connected to processor 20 by a data bus 34 and appropriate interface circuitry.

Connector 22 is mechanically and electrically connected to connector 18 when circuit breaker 10 is assembled. Of course, unit 14 could be appropriately wired to mechanism 12 without the use of connectors 18 and 26.

Display unit (module) 16 may have a plurality of configurations, and, generally, includes a multi-digit display 28, a multi-position switch 30, a connector 32, and a memory 36 for storing configuration data (address). Memory 36 may take the form of dip switches, a set of jumpers (presently preferred embodiment), PROM or other types of ROM. Display 28, switch 30 and memory 36 are coupled to connector 32 such that data may be transferred between unit 14 and unit 16 along data bus 34 when units 14 and 16 are mechanically connected, and connectors 26 and 32 are mechanically and electrically connected.

When unit 14 is operating, and coupled to unit 16, unit 14 reads the data in memory 36 (e.g. 4 bits, one associated with each of 4 jumpers 46, 48, 50 and 52) to determine the configuration of unit 16. Three (3) of the 4 bits of data are available for configuration data, thus, unit 14 can automatically recognize 8 different unit 16 configurations. Upon recognizing the unit 16 configuration, processor 20 operates under the control of the portion of the program stored in unit 14 associated with the particular configuration. For example, one unit 16 may be programmed to display amperage, where each switch 30 setting is associated with different amperage readings while other units may be configured to display a circuit breaker variable such as temperature, power or energy use. Furthermore, display unit 16 may be configured such that trip unit 14 reads switch 30 to acquire control or limit values such as alarm limits. By way of example, switch 30 may include 10 settings thus allowing the display of 10 different characteristics (values) of a given variable, control value or limit value.

Referring more specifically to the characteristics (values) associated with the ten switch positions of switch 30, when switch 30 is associated with a display unit 16 configured to display amperage, switch 30 settings may include:

Present demand, which provides data for processor 20 so that the average amperage load for the last 15 minute period is displayed;

Maximum demand, which provides data for processor 20 so that the maximum amperage load since power was applied to the circuit breaker is displayed;

Phase A current, which provides data for processor 20 so that the amperage load for phase A is displayed;

Phase B current, which provides data for processor 20 so that the amperage load for phase A is displayed;

Phase C current, which provides data for processor 20 so that the amperage load for phase C is displayed;

60% load monitor set point, which provides data for processor 20 so that the maximum phase current is displayed and flashed when the current exceeds 60% of the rated value;

70% load monitor set point, which provides data for processor 20 so that the maximum phase current is displayed and flashed when the current exceeds 70% of the rated value;

80% load monitor set point, which provides data for processor 20 so that the maximum phase current is displayed and flashed when the current exceeds 80% of the rated value;

90% load monitor set point, which provides data for processor 20 so that the maximum phase current is displayed and flashed when the current exceeds 90% of the rated value; and 100% load monitor set point, which provides data for processor 20 so that the maximum phase current is displayed and flashed when the current exceeds 100% of the rated value.

Subsequent to determining the configuration of a particular display unit 16, processor 20 reads the status of switch 30, and transmits display data to unit 16 over data bus 34, where the display data is representative of the characteristic selected at switch 30 and the particular configuration of unit 16 (i.e. the data in memory 36). Thus, if processor 20 reads memory 36 and determines that unit 16 is an amperage display unit, reads switch 30 and determines that the RMS current for phase A is to be displayed, processor 20 will access the appropriate programming and apply the appropriate display data to display 28 via data bus 34 to display the RMS current value for phase A in digital form (alphanumeric) on display 28.

Referring to FIG. 3, FIG. 3 illustrates the circuitry for display unit 16. Unit 16 includes switch 30 coupled to the four low order bits (lines) of data bus 34 by buffers 38, 40, 42 and 44. As discussed above, the presently preferred embodiment of memory 36 may include a set for four jumpers 46, 48, 50 and 52. Jumpers 46, 48, 50 and 52 are coupled to the four high order bits (lines) of data bus 34 by buffers 54, 56, 58 and 60, respectively. When address select line 62 of bus 34 (address 2A00 hex) goes low, switch 30 and memory 36 settings are read by processor 20 over data bus 34.

Display unit 16 also includes four seven segment LED's 64, 66, 68 and 70, and a display driver 72. (By way of modification, displays 64, 66, 68 and 70, and display driver 72 may be replaced by a single chip unit depending upon the application.) Data bus 80 couples display driver 72 to displays 64, 66, 68 and 70. Display driver 72 is coupled to data bus 34 and is controlled by address select lines 74 (address 2800 hex) and 76 (address 2900 hex). A data line 78 is the processor 20 read/write line. When processor 20 writes to address 2800, lines 74 and 78 go low. Address 2800 is used to send data to display driver 72. When processor 20 writes to address 2900, lines 76 and 78 go low. This address is used to send control commands to display driver 72.

When display unit 16 is plugged into trip unit 14, data line J8-19, J8-17, J8-15, J8-13, J8-2, J8-4, J8-6, and J8-8 (D0-D7) connect unit 16 to trip unit 14 via data lines J2-19, J2-17, J2-15, J2-13, J2-2, J2-4, J2-6, and J2-8 (D0-D7), respectively. Also, address select lines 74, 76, 62, and 78 are connected to trip unit 14 via address select lines J2-16, J2-14, J2-12 and the read/write line J2-10, respectively.

Figure 4:
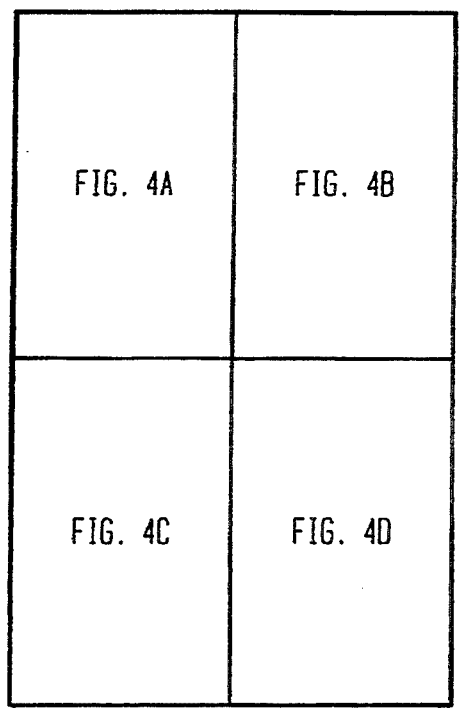
FIG. 4 is the circuit diagram for the circuitry of the trip unit which interfaces with the display unit.
Figure 3A:
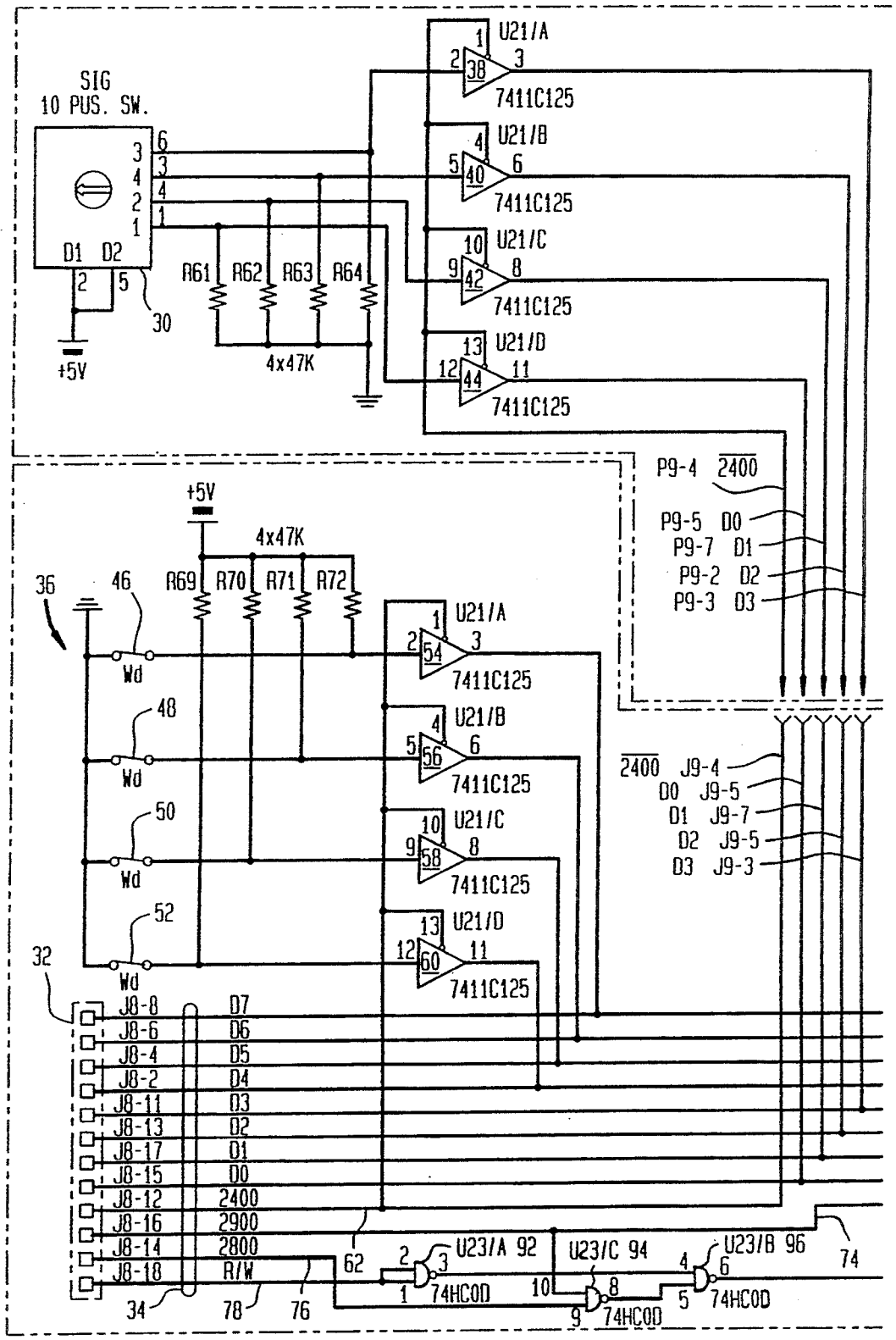
Figure 3B:
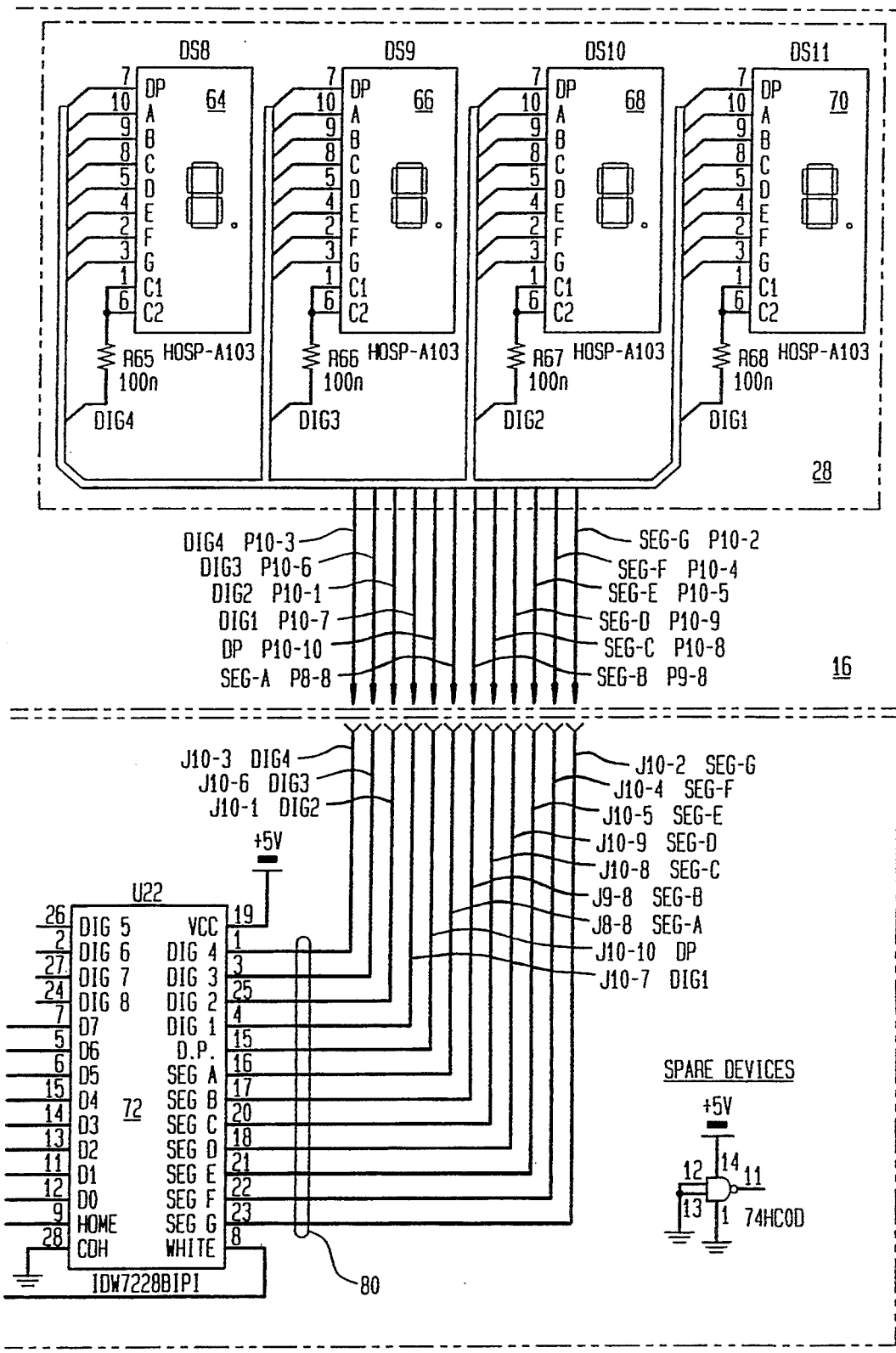
Figure 4A:
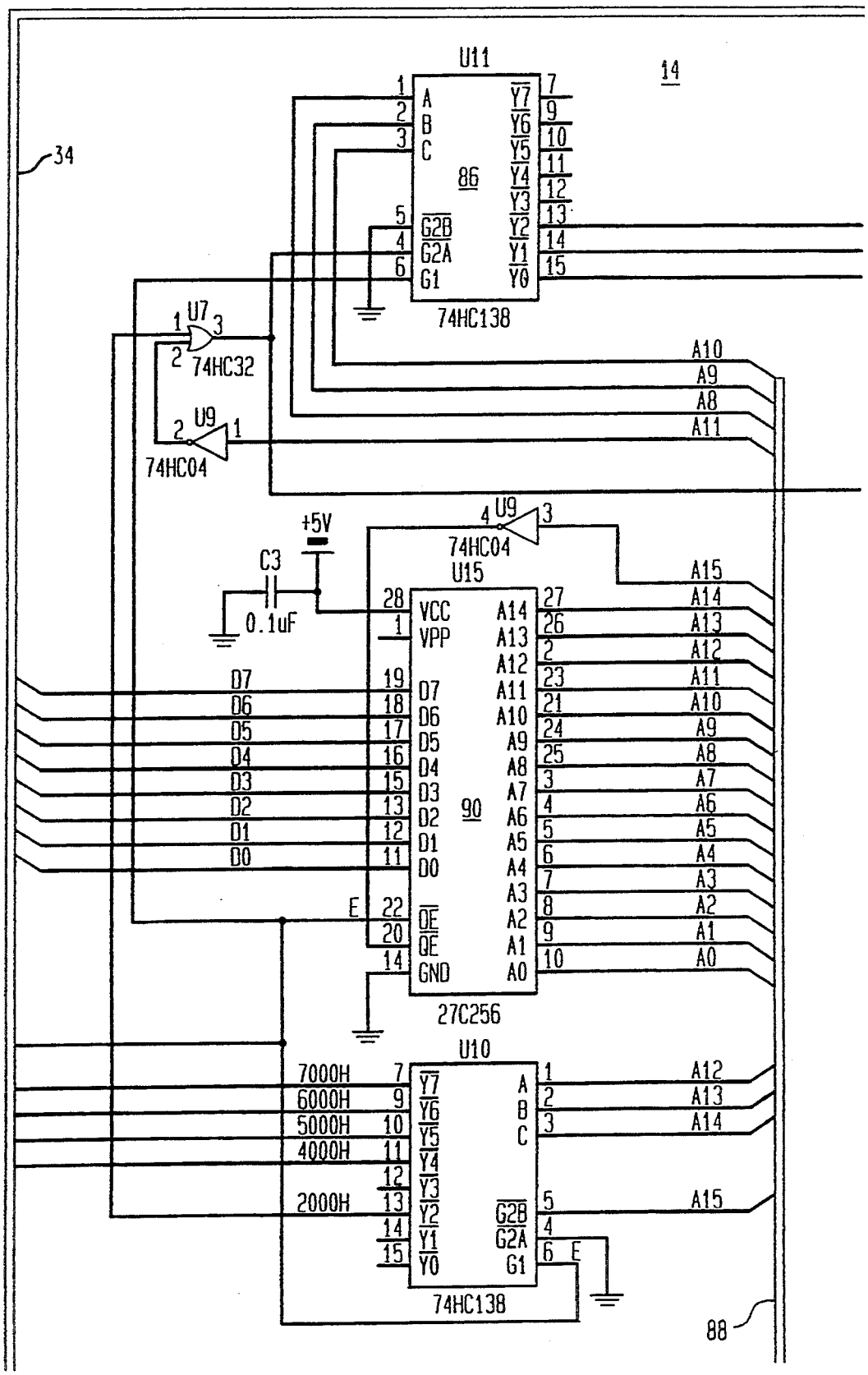
Figure 4B:
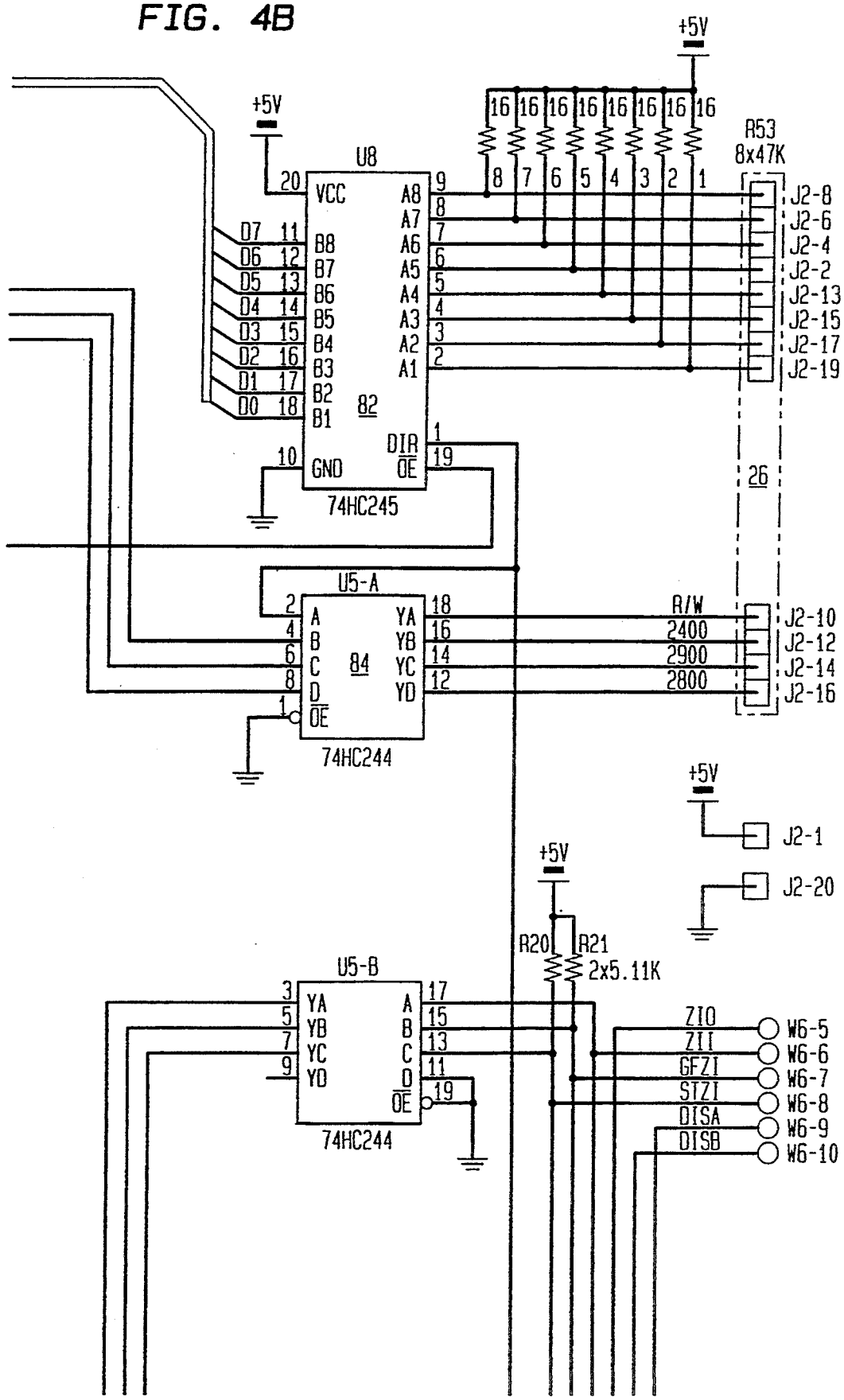
Figure 4C:
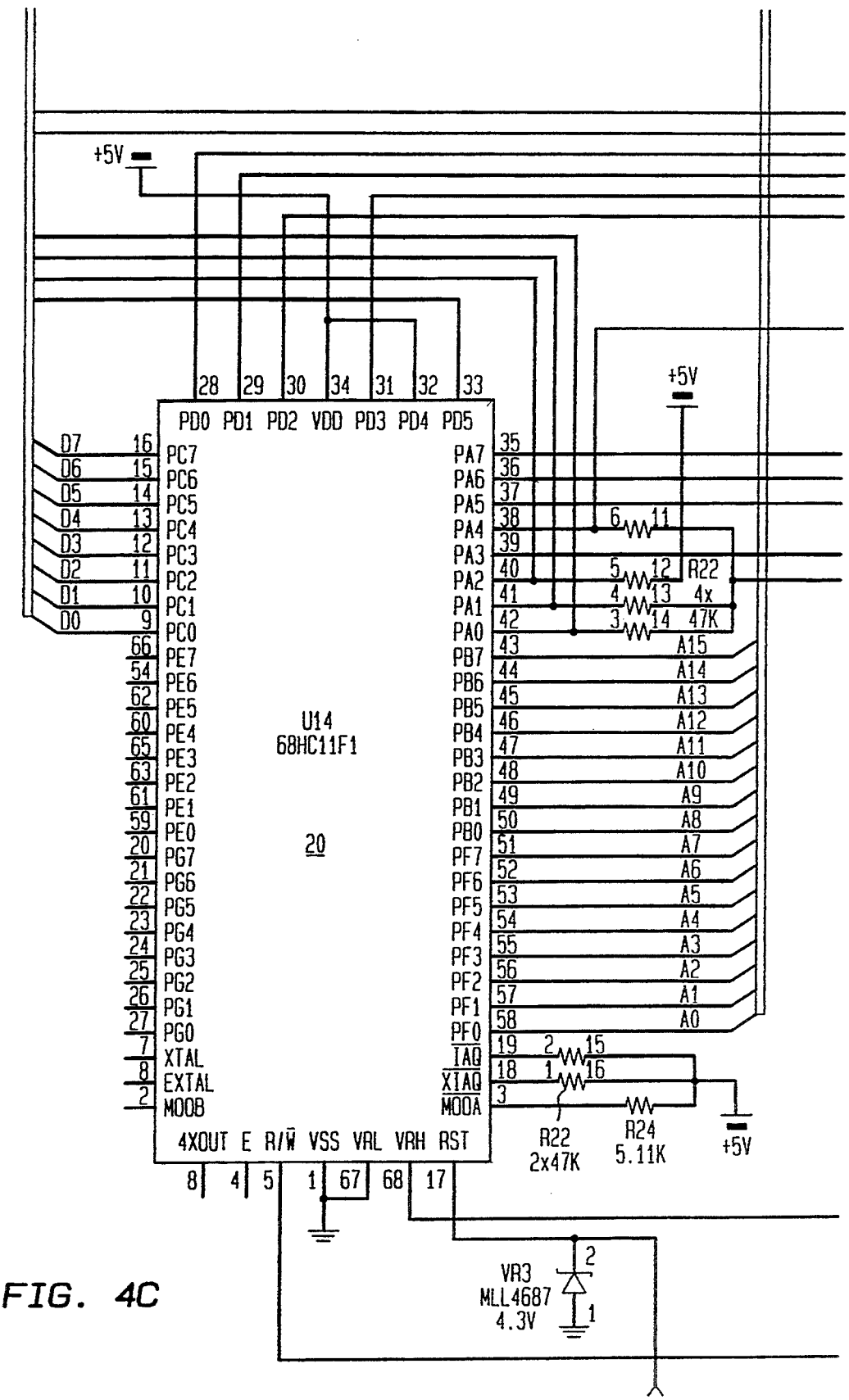
Figure 4D:
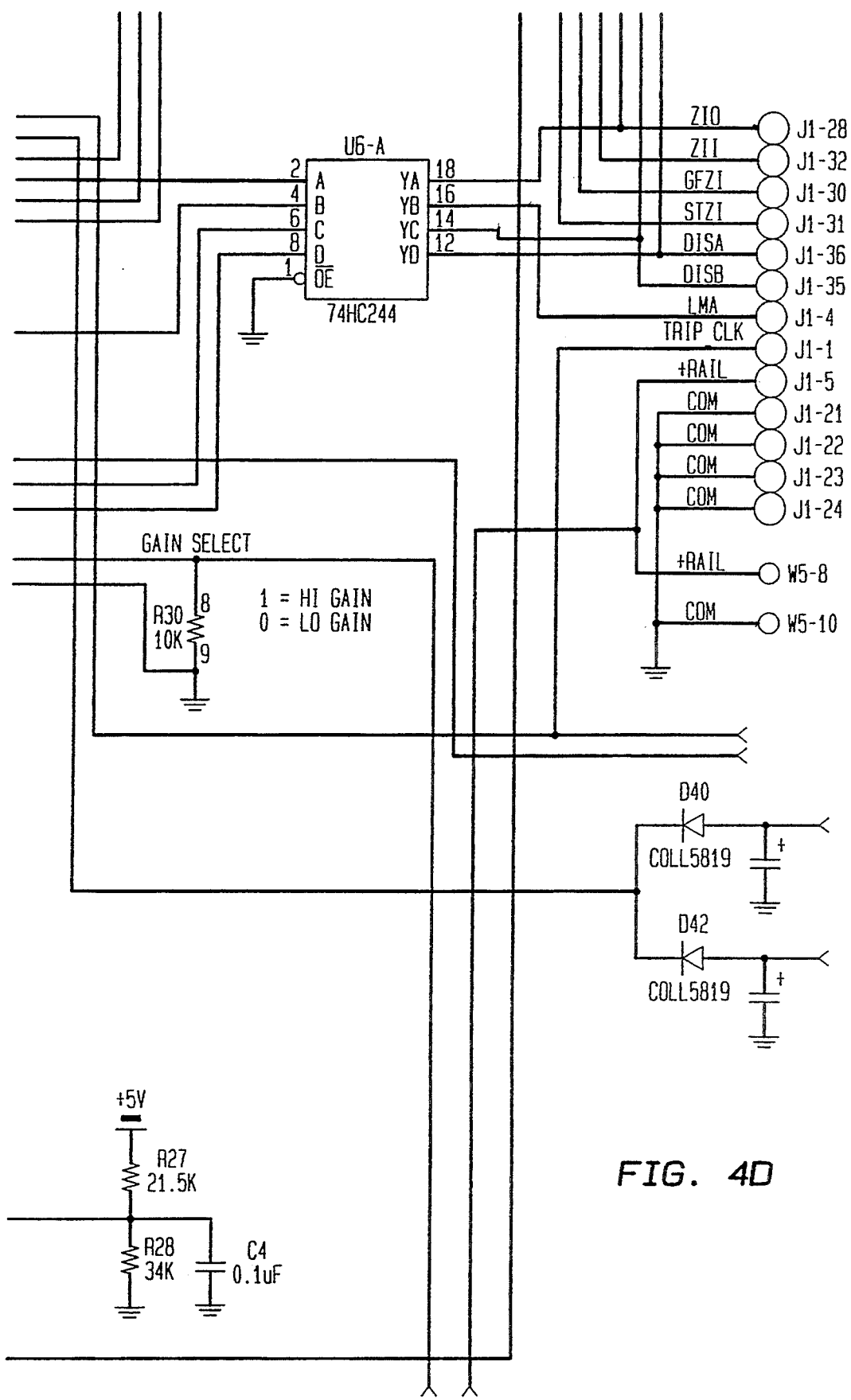

Referring to FIG. 4, the trip unit circuitry includes a processor 20 (Motorola 68HC11F1) coupled to data bus 34, and buffer 82 also coupled to data bus 34. Buffer 82 acts as an isolation buffer between display unit 16 and trip unit 14 for data lines E0-D7. The circuitry of unit 14 also includes an isolation buffer 84 coupled to a decoder 86 which in turn is coupled to an address bus 88 coupled to processor 20. Buffer 84 acts as an isolation buffer between display unit 16 and trip unit 14 address select and read/write lines.

In addition to processor 20, buffer 82, buffer 84 and decoder 86, unit 14 includes an EPROM 90 coupled to data bus 34 and address bus 88. The programming for processor 28, which controls the transfer of data between display unit 16 and trip unit 14, is stored in the memory of processor 20 and EPROM 90 (the source code for this programming is included in Appendix A).

In operation, when processor 20 reads address 200 (address line 62), data bit 7 (data line J8-8) is tested for a high state. If it tests high, then processor 20 assumes that trip unit 14 and display module 16 are connected via connectors 26 and 32. In response, a portion of the display module control code (Appendix A) is activated. Subsequently, the type of display unit 16 is determined by decoding data lines J8-8, J8-6, J8-4 and J8-2. After the type of display unit 16 is determined, the position of switch 30 is determined by decoding data lines J8-13, J8-15, J8-17, and J8-19. Based upon this data, processor 20 then selects the function from the display module software (code) which is to be activated such that data is applied to display 28 to provide proper alphanumeric information at the display. When the values displayed at display 28 are to be flashed due to a maximum phase current exceeding a set point, as discussed above, processor 20 sets the line connected to J2-14 (connected to J8-14 of unit 16) of unit 14 high to signal that a load set point has been exceeded, and provide a flash signal to AND gates 92, 94 and 96. The flash signal causes the gates to control display driver 72 such that display 28 flashes.

It will be understood that the above description is of the preferred exemplary embodiment of the invention, and that the invention is not limited to the specific form shown. For example, various components of the above-described trip unit and display unit may be modified to combine various discreet components into single multi-function components. Furthermore, it is contemplated that portions of the software may be replaced with appropriately configured hardware, and, alternatively, depending upon the microprocessor or controller used as processor 20, the software may be modified such that hardware in the circuits may be eliminated. Various other substitutions, modifications, changes and omissions may be made in the design and arrangement of the elements without departing from the spirit of the invention, as expressed in the appended claims.

APPENDIX A

```
/***********************************************************************/
/*                                                                     */
/*         SYSTEM BREAKER ELECTRONIC TRIP UNIT PROGRAM                 */
/*                        Main Module                                  */
/*                      68HC11-F1 Processor                            */
/*                         Version 2.00                                */
/*                                                                     */
/*         COPYRIGHT 1992 Siemens Energy & Automation, Inc.            */
/*                                                                     */
/*   This program contains the trade secrets and confidential information */
/*   of Siemens Energy & Automation, Inc. It may not be reproduced in  */
/*   whole or in part, in any form or by any means without the express */
/*   written permission of Siemens Energy & Automation, Inc.           */
/*                                                                     */
/***********************************************************************/

/***********************************************************************/
/*   The source code listed below is the code that controls the display */
/*   module.                                                           */
/***********************************************************************/ main ()
{
    while (1)
    {
        .
        .
        .

if ((0x80 & MONITOR_SW) == 0)    /* is a Display installed? */
        {
            Display_Type = MONITOR_SW & 0x70;
            switch (Display_Type)
            {
                case 0 :
                    Display_0 ();    /* Type 0 Display Module */
                    break;
                case 1 :
                    Display_1 ();    /* Type 1 Display Module */
                    break;
                case 2 :
                    Display_2 ();    /* Type 2 Display Module */
                    break;
```

```
            case 3 :
                Display_3 ();    /* Type 3 Display Module */
                break;
            case 4 :
                Display_4 ();    /* Type 4 Display Module */
                break;
            case 5 :
                Display_5 ();    /* Type 5 Display Module */
                break;
            case 6 :
                Display_6 ();    /* Type 6 Display Module */
                break;
            case 7 :
                Display_7 ();    /* Type 7 Display Module */
                break;
        }
    }
    .
    .
    .
    .
    }
} void    Display_0 ()    /* Type 0 Display Module */
{
    Display_Counter = Display_Counter ^ 0x01;   /* Toggle between 1 and 0 */
    if ((Display_Counter > 0) && (Test_Running == FALSE))
    {
        Calculate_Demand ();
        if ((Timing_Out == TRUE) && (Overload_Event == FALSE))
        {
            Overload_Event = TRUE;
        }
        if ((Timing_Out == FALSE) && (Overload_Event == TRUE))
        {
            /* Blank the display */
            LED_CTRL = 0;    /* No Data Coming, Code B, Decode, Shutdown */
            Overload_Event = FALSE;
        }
        if (Display_Setting != MONITOR_SW & 0x0F)
        {
            Display_Setting = MONITOR_SW & 0x0F;
            LED_CTRL = 0;    /* No Data Coming, Code B, Decode, Shutdown */
        }
        switch (Display_Setting)
        {
            case 0 :
                if (Overload_Event == TRUE)
                {
                    /* change Breaker Status to Overload */
                    Str_Copy (Brkr_Status, OL);

/* activate Load Monitor Alarm */
                    PORTA = PORTA | 0x10;
                    Display_Overload ();
                }
                else
                {
                    /* load monitor alarm set at 100% of Rating Plug value */
                    Monitor_Load (100);
                }
                break;
```

```
case 1 :
    /* de-activate Load Monitor Alarm */
    PORTA = PORTA & 0xEF;
    if (Overload_Event == TRUE)
    {
        /* change Breaker Status to Overload */
        Str_Copy (Brkr_Status, OL);
        Display_Overload ();
    }
    else
    {
        /* change Breaker Status to OK */
        Str_Copy (Brkr_Status, OK);

/* display 15 minute demand */
        Display_Demand ();
    }
    break;
case 2 :
    /* de-activate Load Monitor Alarm */
    PORTA = PORTA & 0xEF;
    if (Overload_Event == TRUE)
    {
        /* change Breaker Status to Overload */
        Str_Copy (Brkr_Status, OL);
        Display_Overload ();
    }
    else
    {
        /* change Breaker Status to OK */
        Str_Copy (Brkr_Status, OK);
        Display_Max_Demand ();
    }
    break;
case 3 :
    /* de-activate Load Monitor Alarm */
    PORTA = PORTA & 0xEF;
    if (Overload_Event == TRUE)
    {
        /* change Breaker Status to Overload */
        Str_Copy (Brkr_Status, OL);
        Display_Overload ();
    }
    else
    {
        /* change Breaker Status to OK */
        Str_Copy (Brkr_Status, OK);
        Display_Current (PH_A);
    }
    break;
case 4 :
    /* de-activate Load Monitor Alarm */
    PORTA = PORTA & 0xEF;
    if (Overload_Event == TRUE)
    {
        /* change Breaker Status to Overload */
        Str_Copy (Brkr_Status, OL);
        Display_Overload ();
    }
    else
    {
        /* change Breaker Status to OK */
        Str_Copy (Brkr_Status, OK);
        Display_Current (PH_B);
    }
    break;
case 5 :
    /* de-activate Load Monitor Alarm */
    PORTA = PORTA & 0xEF;
```

```c
        if (Overload_Event == TRUE)
        {
            /* change Breaker Status to Overload */
            Str_Copy (Brkr_Status, OL);
            Display_Overload ();
        }
        else
        {
            /* change Breaker Status to OK */
            Str_Copy (Brkr_Status, OK);
            Display_Current (PH_C);
        }
        break;
    case 6 :
        if (Overload_Event == TRUE)
        {
            /* change Breaker Status to Overload */
            Str_Copy (Brkr_Status, OL);

/* activate Load Monitor Alarm */
            PORTA = PORTA | 0x10;
            Display_Overload ();
        }
        else
        {
            /* load monitor alarm set at 60% of Rating Plug value */
            Monitor_Load (60);
        }
        break;
    case 7 :
        if (Overload_Event == TRUE)
        {
            /* change Breaker Status to Overload */
            Str_Copy (Brkr_Status, OL);

/* activate Load Monitor Alarm */
            PORTA = PORTA | 0x10;
            Display_Overload ();
        }
        else
        {
            /* load monitor alarm set at 70% of Rating Plug value */
            Monitor_Load (70);
        }
        break;
    case 8 :
        if (Overload_Event == TRUE)
        {
            /* change Breaker Status to Overload */
            Str_Copy (Brkr_Status, OL);

/* activate Load Monitor Alarm */
            PORTA = PORTA | 0x10;
            Display_Overload ();
        }
        else
        {
            /* load monitor alarm set at 80% of Rating Plug value */
            Monitor_Load (80);
        }
        break;
    case 9 :
        if (Overload_Event == TRUE)
        {
            /* change Breaker Status to Overload */
            Str_Copy (Brkr_Status, OL);

/* activate Load Monitor Alarm */
            PORTA = PORTA | 0x10;
            Display_Overload ();
```

```
            }
            else
            {
                /* load monitor alarm set at 90% of Rating Plug value */
                Monitor_Load (90);
            }
            break;
        }
    }
} void    Display_1 ()    /* Type 1 Display Module */
{
    ;   /* null C statment */
} void    Display_2 ()    /* Type 2 Display Module */
{
    ;   /* null C statment */
} void    Display_3 ()    /* Type 3 Display Module */
{
    ;   /* null C statment */
} void    Display_4 ()    /* Type 4 Display Module */
{
    ;   /* null C statment */
} void    Display_5 ()    /* Type 5 Display Module */
{
    ;   /* null C statment */
} void    Display_6 ()    /* Type 6 Display Module */
{
    ;   /* null C statment */
} void    Display_7 ()    /* Type 7 Display Module */
{
    ;   /* null C statment */
} unsigned int  Sqr_Root (unsigned int  Squared_Amps)
{
    void    Int_by_Int_MUL (),
            Lg_Int_by_Int_DIV ();

unsigned int    Dsply_Adjust;
    unsigned int    Frac_Root;
    unsigned int    Whole_Root;
    unsigned int    Lo_Num;
```

```
    unsigned int    Hi_Num;
    unsigned int    Combo_Root;
    unsigned int    Display_Amps;

if (Gain_Mode == GAIN_ON)
    {
        Dsply_Adjust = Display_Adjust [GAIN_ON];
    }
    else
    {
        Dsply_Adjust = Display_Adjust [GAIN_OFF];
    }
    Whole_Root = 0;
    while (Squares_Table [Whole_Root] <= Squared_Amps)
    {
        ++Whole_Root;
    }
    Hi_Num = Squares_Table [Whole_Root];
    --Whole_Root;
    Lo_Num = Squares_Table [Whole_Root];
    Frac_Root = ((Squared_Amps - Lo_Num) * 0x100) / (Hi_Num - Lo_Num);
    Combo_Root = (Whole_Root * 0x100) + Frac_Root;
    Display_Amps = (Combo_Root * Dsply_Adjust) / 0x100;
    return (Display_Amps);
} void    Display_Overload ()
{
    static  unsigned char   Flash_Display = 0;

Flash_Display = Flash_Display ^ 0x01;  /* toggle between 1 and 0 */
    if (Flash_Display > 0)
    {
        LED_CTRL = 0x90;    /* Data Coming, Code B, Decode, Normal mode */
        LED_DATA = 0x8A;    /* send a dash */
        LED_DATA = 0x8D;    /* send an "L" */
        LED_DATA = 0x80;    /* send an "O" */
        LED_DATA = 0x8A;    /* send a dash */
        LED_DATA = 0X8F;    /* unused digit, send a blank */
        LED_DATA = 0X8F;    /* unused digit, send a blank */
        LED_DATA = 0X8F;    /* unused digit, send a blank */
        LED_DATA = 0X8F;    /* unused digit, send a blank */
    }
    else
    {
        LED_CTRL = 0;    /* No Data Coming, Code B, Decode, Shutdown */
    }
} void    Monitor_Load (Alarm_Setting)
unsigned char   Alarm_Setting;
{
    static  unsigned char   Display_Blank = TRUE;
    static  unsigned char   Flash_Display = 0;
    unsigned int    Setpoint;
    unsigned int    Hi_Phase;
    unsigned char   Display_Str [5];
    unsigned char   Temp_Str [5];

if (Gain_Mode == GAIN_ON)
    {
            /* Instantaneous 2x value / 2 = 100% pickup value */
        Setpoint = ((*(IN_Pickup_Ptr + 1) >> 1) * LT_GAIN_ON_CURRENT) / 10;
        Setpoint = (Setpoint * Percent_Rating) / 100;
        Setpoint = (Setpoint * Alarm_Setting) / 100;
        Setpoint = Setpoint * Display_Adjust [GAIN_ON];
```

```
    }
    else
    {
            /* Instantaneous 2x value / 2 = 100% pickup value */
        Setpoint = ((*(IN_Pickup_Ptr + 1) >> 1) * LT_GAIN_OFF_CURRENT) / 10;
        Setpoint = (Setpoint * Percent_Rating) / 100;
        Setpoint = (Setpoint * Alarm_Setting) / 100;
        Setpoint = Setpoint * Display_Adjust [GAIN_OFF];
    }

Hi_Phase = Long_Time_RMS [PH_A];
    if (Long_Time_RMS [PH_B] > Hi_Phase)
    {
        Hi_Phase = Long_Time_RMS [PH_B];
    }
    if (Long_Time_RMS [PH_C] > Hi_Phase)
    {
        Hi_Phase = Long_Time_RMS [PH_C];
    }
    Hi_Phase = Sqr_Root (Hi_Phase);
    if (Hi_Phase > Setpoint)
    {
        /* change Breaker Status to Load Monitor Alarm */
        Str_Copy (Brkr_Status, A0);
        PORTA = PORTA | 0x10;         /* activate Load Monitor Alarm */
        Flash_Display = Flash_Display ^ 0x01; /* toggle between 1 and 0 */
        if (Flash_Display > 0)
        {
            Display_Blank = FALSE;
            Conv_to_Dec_Str (Hi_Phase, Display_Str);
            while (Str_Length (Display_Str) < 4)
            {
                Str_Copy (Temp_Str, Blank);
                Str_Concat (Temp_Str, Display_Str);
                Str_Copy (Display_Str, Temp_Str);
            }
            LED_CTRL = 0x90;    /* Data Coming, Code B, Decode, Normal mode */
            LED_DATA = Display_Str [3] + 0x50;    /* send low order digit */
            LED_DATA = Display_Str [2] + 0x50;    /* send 2rd order digit */
            LED_DATA = Display_Str [1] + 0x50;    /* send 3nd order digit */
            LED_DATA = Display_Str [0] + 0x50;    /* send high order digit */
            LED_DATA = 0X8F;    /* unused digit, send a blank */
            LED_DATA = 0X8F;    /* unused digit, send a blank */
            LED_DATA = 0X8F;    /* unused digit, send a blank */
            LED_DATA = 0X8F;    /* unused digit, send a blank */
        }
        else
        {
            Display_Blank = TRUE;
            LED_CTRL = 0;    /* No Data Coming, Code B, Decode, Shutdown */
        }
    }
    else
    {
        Str_Copy (Brkr_Status, OK); /* change Breaker Status to OK */
        PORTA = PORTA & 0xEF;        /* de-activate Load Monitor Alarm */
        if (Display_Blank == FALSE)
        {
            LED_CTRL = 0;    /* No Data Coming, Code B, Decode, Shutdown */
            Display_Blank = TRUE;
        }
    }
} void    Calculate_Demand ()
{
```

```
    unsigned int               LT_Root_A;
    unsigned int               LT_Root_B;
    unsigned int               LT_Root_C;
    unsigned int               LT_Avg_Root;
    static unsigned int        Demand_Counter = 0;
    static unsigned long int   LT_Avg_Sum     = 0;

LT_Root_A = Sqr_Root (Long_Time_RMS [PH_A]);
    LT_Root_B = Sqr_Root (Long_Time_RMS [PH_B]);
    LT_Root_C = Sqr_Root (Long_Time_RMS [PH_C]);
    LT_Avg_Root = (LT_Root_A + LT_Root_B + LT_Root_C) / 3;
    LT_Avg_Sum = LT_Avg_Sum + LT_Avg_Root;
    ++Demand_Counter;
    if (Demand_Counter >= 1155)   /* 1155 = 15 minutes */
    {
        LT_Demand = LT_Avg_Sum / Demand_Counter;
        if (LT_Demand > Max_LT_Demand)
        {
            Max_LT_Demand = LT_Demand;
        }
        Demand_Counter = 0;
        LT_Avg_Sum = 0;
    }
} void    Display_Demand ()
{
    unsigned char   Display_Str [5];
    unsigned char   Temp_Str [5];

if (LT_Demand > 0)
    {
        Conv_to_Dec_Str (LT_Demand, Display_Str);
        while (Str_Length (Display_Str) < 4)
        {
            Str_Copy (Temp_Str, Blank);
            Str_Concat (Temp_Str, Display_Str);
            Str_Copy (Display_Str, Temp_Str);
        }
        LED_CTRL = 0x90;    /* Data Coming, Code B, Decode, Normal mode */
        LED_DATA = Display_Str [3] + 0x50;   /* send low order digit */
        LED_DATA = Display_Str [2] + 0x50;   /* send 2rd order digit */
        LED_DATA = Display_Str [1] + 0x50;   /* send 3nd order digit */
        LED_DATA = Display_Str [0] + 0x50;   /* send high order digit */
        LED_DATA = 0X8F;    /* unused digit, send a blank */
        LED_DATA = 0X8F;    /* unused digit, send a blank */
        LED_DATA = 0X8F;    /* unused digit, send a blank */
        LED_DATA = 0X8F;    /* unused digit, send a blank */
    }
} void    Display_Max_Demand ()
{
    unsigned char   Display_Str [5];
    unsigned char   Temp_Str [5];

if (Max_LT_Demand > 0)
    {
        Conv_to_Dec_Str (Max_LT_Demand, Display_Str);
        while (Str_Length (Display_Str) < 4)
        {
            Str_Copy (Temp_Str, Blank);
            Str_Concat (Temp_Str, Display_Str);
            Str_Copy (Display_Str, Temp_Str);
```

```
        }
        LED_CTRL = 0x98;       /* Data Coming, Code B, Decode, Normal mode */
        LED_DATA = Display_Str [3] + 0x50;    /* send low order digit */
        LED_DATA = Display_Str [2] + 0x50;    /* send 2rd order digit */
        LED_DATA = Display_Str [1] + 0x50;    /* send 3nd order digit */
        LED_DATA = Display_Str [0] + 0x50;    /* send high order digit */
        LED_DATA = 0X8F;       /* unused digit, send a blank */
        LED_DATA = 0X8F;       /* unused digit, send a blank */
        LED_DATA = 0X8F;       /* unused digit, send a blank */
        LED_DATA = 0X8F;       /* unused digit, send a blank */
    }
} void    Reset_Max_Demand ()
{
    LED_CTRL = 0;    /* No Data Coming, Code B, Decode, Shutdown */
    Max_LT_Demand = 0;
} void    Display_Current (Phase)
unsigned char   Phase;
{
    unsigned int    LT_Root;
    unsigned char   Display_Str [5];
    unsigned char   Temp_Str [5];

switch (Phase)
    {
        case PH_A :
            LT_Root = Long_Time_RMS [PH_A];
            break;
        case PH_B :
            LT_Root = Long_Time_RMS [PH_B];
            break;
        case PH_C :
            LT_Root = Long_Time_RMS [PH_C];
            break;
    }
    LT_Root = Sqr_Root (LT_Root);
    Conv_to_Dec_Str (LT_Root, Display_Str);
    while (Str_Length (Display_Str) < 4)
    {
        Str_Copy (Temp_Str, Blank);
        Str_Concat (Temp_Str, Display_Str);
        Str_Copy (Display_Str, Temp_Str);
    }
    LED_CTRL = 0x98;       /* Data Coming, Code B, Decode, Normal mode */
    LED_DATA = Display_Str [3] + 0x50;    /* send low order digit */
    LED_DATA = Display_Str [2] + 0x50;    /* send 2rd order digit */
    LED_DATA = Display_Str [1] + 0x50;    /* send 3nd order digit */
    LED_DATA = Display_Str [0] + 0x50;    /* send high order digit */
    LED_DATA = 0X8F;       /* unused digit, send a blank */
    LED_DATA = 0X8F;       /* unused digit, send a blank */
    LED_DATA = 0X8F;       /* unused digit, send a blank */
    LED_DATA = 0X8F;       /* unused digit, send a blank */
}
```

What is claimed is:

1. A trip unit comprising:
a first connector;
a processor which selectively accesses program code for transferring data between the processor and a plurality of types of display modules;
a data bus coupled between the connector and processor; and
a display module including therein a memory which stores configuration data indicative of the type of display module; and a second connector coupled to the memory and connected to the first connector, wherein the processor reads the configuration data, thereby identifying the type of display module which is coupled to the connectors, accesses a respective portion of the program code based upon the configuration data read from the display module, and transfers data between the processor and module.

2. The unit of claim 1, where the memory is a set of jumpers.

3. The unit of claim 1, where the display module comprises a digital display which displays alphanumeric data in response to data transferred from the processor to the module.

4. The unit of claim 3, where the display module comprises a switch coupled to the second connector to provide control data to the processor, and the processor provides display data to the digital display which is dependent upon the control data.

5. The unit of claim 1, where the display module comprises a switch coupled to the second connector to provide control data to the processor and where the processor sets limit values in the trip unit based upon the control data.

6. A system for providing a trip unit with a display module comprising:
 a trip unit having a processor which selectively accesses program code for transferring data between the processor and a plurality of types of display modules, and a first connector coupled to the processor;
 a first display module having a first memory therein which stores first configuration data indicative that it is the first type of display module, coupled to a second connector; and
 a second display module having a second memory therein which stores second configuration data indicative that it is the type second of display module coupled to a third connector;
 wherein the first and second connectors are connected, the processor reads the first configuration data in the first memory, thereby identifying that it is connected to the first display module, accesses a first portion of the program code based upon the first configuration data and applies a first display data to the first display module, and, when the first and third connectors are connected, the processor reads the second configuration data in the second memory, thereby identifying that it is connected to the second display module, accesses a second portion of the program code based upon the second configuration data and applies a second display data to the second display module.

7. The system of claim 6, where the first and second memories each comprise a set of jumpers.

8. The system of claim 6, where the first and second modules each include a digital display.

9. The system of claim 6, where the first and second modules each comprise a switch coupled to the second and third connectors respectively, where the switches provide control data to the processor.

10. The system of claim 9, where the processor sets limit values in the trip unit based upon the control data.

11. The system of claim 9, where the processor provides display data to the display modules based upon the control data.

12. A trip unit comprising:
 a processor which selectively accesses program code for operating a plurality of types of display modules; and
 a display module coupled to the processor, the display module including therein a memory which stores configuration data indicative of the type of the display module;
 wherein the processor accesses the display module memory, reads the configuration data, and accesses a respective portion of the program code for operation of the display module, based on the configuration data read therefrom.

13. A trip unit comprising:
 a connector for receipt of different types of interchangeable display modules;
 a processor coupled to the connector for reading configuration data from a given display module being coupled to the connector and thereby identifying the type of display module being coupled to the connector; and
 memory coupled to the processor and having program codes stored therein for operating a plurality of types of display modules;
 wherein the processor accesses a respective portion of the program code for operation of the display module being coupled to the connector, based on the configuration data read therefrom.

14. A circuit breaker trip unit comprising:
 a processor which selectively accesses program code for operating a plurality of types of optional feature modules; and
 an optional feature module coupled to the processor, the module including therein a memory which stores configuration data indicative of he type of module;
 wherein the processor accesses the module memory, reads the configuration data, and accesses a respective portion of the program code for operation of the module, based on the configuration data.

15. A circuit breaker trip unit comprising:
 a connector for receipt of different types of interchangeable optional feature modules;
 a processor, coupled to the connector, for reading from a module configuration data which identifies the type of module coupled to the connector; and
 memory coupled to the processor having program codes stored therein for operating a plurality of types of optional feature modules;
 wherein the processor reads the configuration data, and accesses a respective portion of the program code for operation of the optional feature module, based on the configuration data read therefrom.

* * * * *

UNITED STATES PATENT AND TRADEMARK OFFICE
CERTIFICATE OF CORRECTION

PATENT NO. : 5,426,592

DATED : June 20, 1995

INVENTOR(S) : Leone et al.

It is certified that error appears in the above-identified patent and that said Letters Patent is hereby corrected as shown below:

On the Title Page, Item [54]:

<u>delete</u>: "OPERATED"

<u>and insert in its place</u>:
--OPERATE--

Signed and Sealed this

Twenty-fourth Day of October, 1995

Attest:

BRUCE LEHMAN

Attesting Officer

Commissioner of Patents and Trademarks